United States Patent
Prausse et al.

(10) Patent No.: US 8,942,066 B2
(45) Date of Patent: Jan. 27, 2015

(54) COMPOSITE ASSEMBLY FOR A MOTOR VEHICLE

(71) Applicant: Volkswagen Aktiengesellschaft, Wolfsburg (DE)

(72) Inventors: Claudia Prausse, Braunschweig (DE); Stephan Max, Gifhorn (DE); Olgierd Zaleski, Hamburg (DE); Andreas Bockstedte, Jork (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/162,170

(22) Filed: Jan. 23, 2014

(65) Prior Publication Data
US 2014/0133277 A1 May 15, 2014

Related U.S. Application Data

(63) Continuation of application No. PCT/EP2012/002959, filed on Jul. 13, 2012.

(30) Foreign Application Priority Data

Jul. 23, 2011 (DE) .......................... 10 2011 108 403

(51) Int. Cl.
*G10K 11/18* (2006.01)
*G10K 11/00* (2006.01)
*B60R 19/48* (2006.01)
(Continued)

(52) U.S. Cl.
CPC .............. *G10K 11/18* (2013.01); *B60R 19/483* (2013.01); *G01S 7/521* (2013.01); *G10K 11/004* (2013.01); *G10K 11/002* (2013.01); *G10K 11/16* (2013.01); *G01S 2015/938* (2013.01)
USPC .......................................................... 367/188

(58) Field of Classification Search
CPC . B60R 19/483; G01S 7/521; G01S 2015/938; G10K 11/18; G10K 11/002; G10K 11/16
USPC .................................. 367/140, 138, 909, 188
See application file for complete search history.

(56) References Cited

U.S. PATENT DOCUMENTS

| 7,490,517 | B2 | 2/2009 | Yoshida et al. |
| 7,518,491 | B2 | 4/2009 | Oda et al. |

(Continued)

FOREIGN PATENT DOCUMENTS

| DE | 906 425 | 3/1954 |
| DE | 1 276 515 | 8/1968 |

(Continued)

*Primary Examiner* — Daniel Pihulic
(74) *Attorney, Agent, or Firm* — Muncy, Geissler, Olds & Lowe, P.C.

(57) ABSTRACT

A composite assembly for a motor vehicle having at least one electroacoustic transducer for outputting sound waves and at least one wall element of the motor vehicle, behind which the transducer is mounted in a concealed manner, wherein an intermediate element for influencing the sound emission behavior is arranged between the transducer and the wall element, the intermediate element having a contact surface facing the wall element for passing on the sound waves. At least one recess is formed within the contact surface, in which recess no contact is made between the intermediate element and the wall element. In this way, it is possible to influence the emission characteristics of the electroacoustic transducer in a very flexible and need-oriented manner.

17 Claims, 3 Drawing Sheets

(51) Int. Cl.
*G01S 7/521* (2006.01)
*G10K 11/16* (2006.01)
*G01S 15/93* (2006.01)

(56) References Cited

U.S. PATENT DOCUMENTS

| | | | |
|---|---|---|---|
| 2008/0101645 A1* | 5/2008 | Rosen | 381/389 |
| 2009/0110224 A1* | 4/2009 | Tobin et al. | 381/340 |
| 2010/0208553 A1* | 8/2010 | Massa | 367/140 |
| 2012/0180569 A1* | 7/2012 | Inoue et al. | 73/589 |
| 2014/0133277 A1* | 5/2014 | Prausse et al. | 367/140 |

FOREIGN PATENT DOCUMENTS

| | | |
|---|---|---|
| DE | 41 14 180 A1 | 11/1992 |
| DE | 10 2006 034 997 A1 | 2/2007 |
| DE | 10 2006 035 607 A1 | 4/2007 |
| DE | 10 2006 038 598 A1 | 5/2008 |
| DE | 10 2008 017 067 A1 | 10/2009 |
| DE | 102011108403 A1 * | 1/2013 |
| JP | 2007114182 A * | 5/2007 |
| WO | WO 2011/089644 A1 | 7/2011 |
| WO | WO 2013013783 A1 * | 1/2013 |

* cited by examiner

1

COMPOSITE ASSEMBLY FOR A MOTOR VEHICLE

This nonprovisional application is a continuation of International Application No. PCT/EP2012/002959, which was filed on Jul. 13, 2012, and which claims priority to German Patent Application No. DE 10 2011 108 403.0, which was filed in Germany on Jul. 23, 2011, and which are both herein incorporated by reference.

BACKGROUND OF THE INVENTION

1. Field of the Invention

The present invention relates to a composite assembly for a motor vehicle.

2. Description of the Background Art

It is increasingly customary for technical design reasons to mount electroacoustic transducers (in the following called, for example, a distance sensor concealed behind a part of the motor vehicle (for example, a bumper cover).

This has in fact the advantage that the design of a motor vehicle in the area of the mounted distance sensors is not negatively affected by these otherwise visible distance sensors, but it also entails certain functional disadvantages.

It is problematic that the distance sensor in the case of concealed mounting must send and receive ultrasonic waves through a wall element of a motor vehicle, which reduces the efficiency of the dispersion of ultrasonic waves, on the one hand, and the sensitivity of the distance sensor, on the other.

In this regard, the emission behavior of concealed mounted distance sensors can be divided into two cases in principle:

On the one hand, a "direct" acoustic emission occurs perpendicular to the surface of the wall element, and, on the other, an "indirect" acoustic emission occurs approximately at a 45 degree angle, which is caused by the surface waves generated on the wall element.

Overall, this results in emission characteristics in which a clear drop in the sound pressure level is noted in a radiation angle range of about ±22 degrees.

This, "partial blind range" has the result that during the application of distance sensors it must always be assured that this indicated blind range is covered by an adjacent distance sensor.

DE 10 2006 034 997 A1, which corresponds to U.S. Pat. No. 7,518,491, discloses a composite assembly for a motor vehicle. In this regard, an intermediate element is employed, which can be formed plate-shaped and rectangular in outline. Furthermore, it is also proposed to form the intermediate element as a truncated cone. The intermediate element is said to have a favorable effect on the directivity of the electroacoustic transducer and its sensitivity.

SUMMARY OF THE INVENTION

It is therefore an object of the present invention to provide an alternative option for a composite assembly for a motor vehicle, which enables a very flexible influencing of the acoustic emission behavior or the sensitivity of a mounted distance sensor.

In an embodiment, the invention therefore proceeds from a composite assembly for a motor vehicle, comprising at least one electroacoustic transducer for emitting sound waves and at least one wall element of the motor vehicle, behind which the transducer is mounted in a concealed manner, whereby an intermediate element for influencing the sound emission behavior is arranged between the transducer and the wall element and the intermediate element has a contact surface, facing the wall element, for transmitting the sound waves.

It is provided according to an embodiment of the invention that at least one recess, in which there is no contact between the intermediate element and the wall element, is formed within the contact surface.

Contact can be understood here, apart from a direct contact, also as an indirect contact, in which, for example, an adhesive layer is inserted between the contact surface and the wall element.

By this embodiment of the intermediate element of the invention, it is possible to form the sound waves introduced by the distance sensor into the wall element so that the desired emission characteristics result. It is possible in particular to "smooth" the emission characteristics, therefore to provide them without notable drops in the sound pressure level in said angle range of about ±22 degrees.

An embodiment of the invention provides that the contact surface has a plurality of recesses. The recesses can be rectangular, for example. The contact zones formed by the intermediate element are repeatedly raised or interrupted by the recesses, as a result of which the flexibility in the generation of desired emission characteristics is increased further.

Alternatively, however, it is also conceivable to form at least one area, in which contact between the intermediate element and the wall element occurs again, within the recess. In this case, the area can be circular or rectangular. In the case of the formation of a number of such areas within the recess, a mixture of cross-sectional shapes is also conceivable. Thus, a number of areas can be made circular, for example, and/or rectangular. Other cross-sectional shapes are also conceivable.

It has proven advantageous for a vertical focusing of the sound radiation angle when the contact surface and the recess are rectangular in their outline. In the mounted state of the composite assembly, the long sides of the outline are then to be oriented approximately horizontally.

Vertical focusing of the sound radiation angle is particularly desirable in distance sensors used as parking aids. Because of this, inadvertent detection of the road surface can be considerably reduced.

In order to improve the decay behavior of the composite assembly comprising the electroacoustic transducer, intermediate element, and wall element, it can be provided in addition to also insert in each case a sound-absorbing material, for example, foam or the like, in the recess or recesses of the intermediate element.

Tests have shown furthermore that spreading of surface waves generated by the distance sensor on the wall element can be effectively limited, if the intermediate element is surrounded at least in certain areas by a damping element, whereby the damping element also lies on the wall element (for example, is glued to it) and is at a distance to the intermediate element.

The sought effect can be improved further if the damping element is arranged frame-like around the intermediate element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
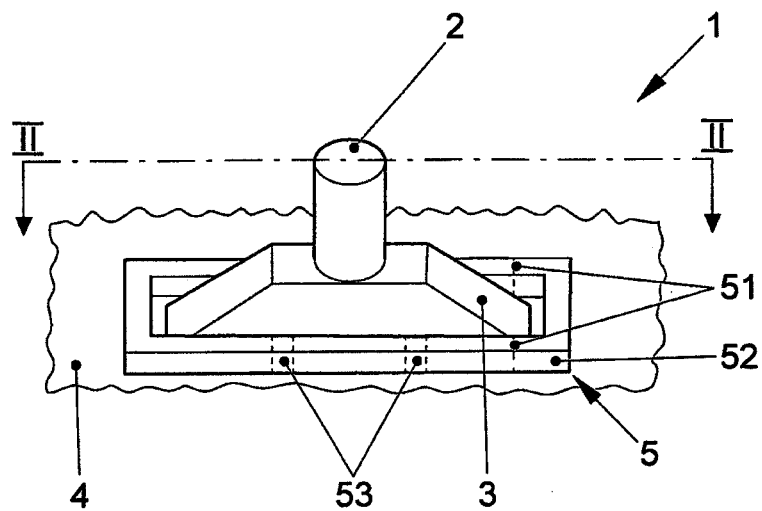
FIG. 1 shows a perspective view of a composite assembly according to an exemplary embodiment of the invention.
Figure 2:
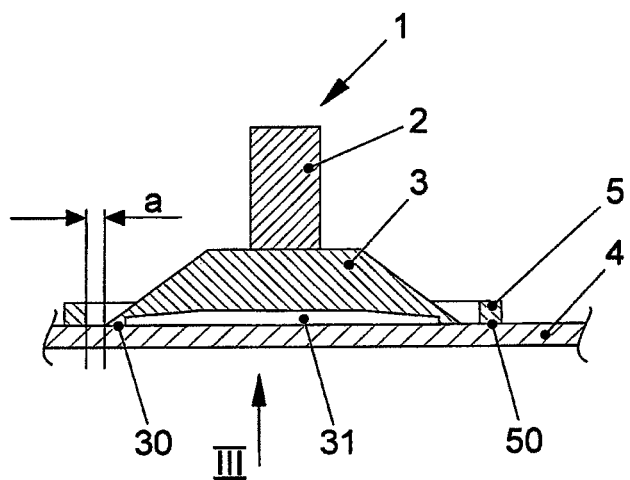
FIG. 2 shows a sectional view of the composite assembly from FIG. 1 according to section line II (longitudinal section)

A composite assembly 1, which comprises a distance sensor 2, which is mounted concealed behind a wall element 4 of a motor vehicle in the form of a bumper cover, is shown in these figures. Distance sensor 2 is therefore not visible in a view direction looking at the motor vehicle from the outside. It can generate and receive vibrations in a manner that is not shown.

A block-shaped intermediate element 3, by which distance sensor 2 is mounted on wall element 4, is provided between distance sensor 2 and wall element 4. In this regard, intermediate element 3 lies with a contact surface 30 on wall element 4 and, for example, can be glued to it. Other mounting methods, such as, for example, ultrasonic welding or friction welding, are also conceivable.

It is evident further that a recess 31 is provided within contact surface 30, where no contact surface for wall element 4 is formed. In the area of recess 31 intermediate element 3 therefore does not lie directly or indirectly (for example, via an adhesive layer) on wall element 4.

Figure 3:
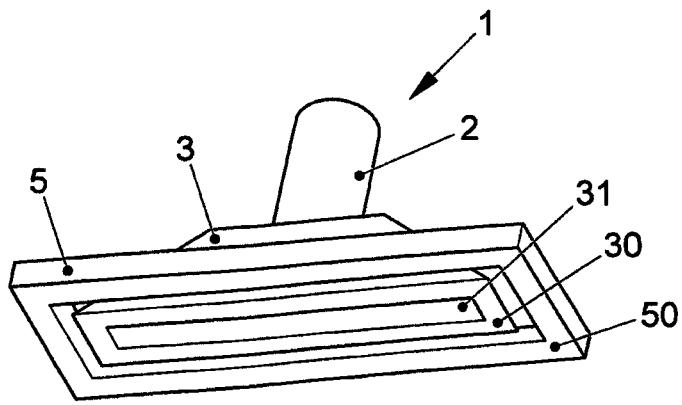
FIG. 3 shows a perspective illustration of the composite assembly of the invention with regard to the contact surface of the intermediate element, whereby the wall element of the motor vehicle is omitted.

Contact surface 30 and recess 31 are each made rectangular in their outline (cf. in particular FIG. 3).

Furthermore, a damping element 5, which is arranged frame-like around intermediate element 3, can be seen in the figures In this regard, the damping element is likewise made rectangular in its outline and is arranged at a distance 'a' around intermediate element 3. Damping element 5 for its part lies with a contact surface 50 on wall element 4 and can also be glued to it. Damping element 5, however, need not necessarily be arranged like a frame around intermediate element 3. It is also conceivable, for example, that an end part 52 is cropped at cut surfaces 51, if, e.g., the geometric relationships in this area do not require an increase in local rigidity.

For example, the insertion of interruptions 53 (indicated by the dashed lines) is just as conceivable.

Figure 4:
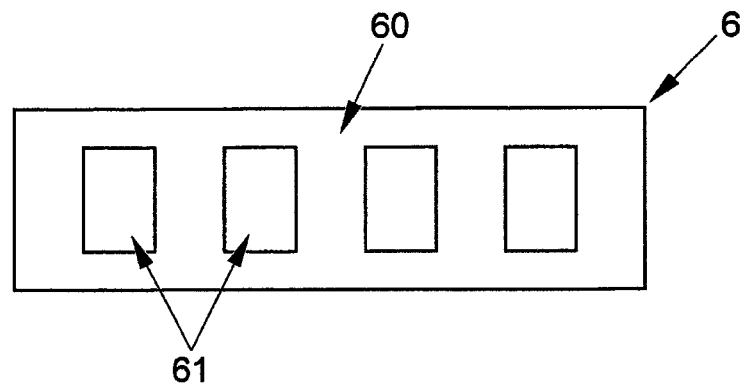
FIG. 4 shows an illustration of a second exemplary embodiment, whereby only the contact surface of the intermediate element is illustrated.
Figure 5:
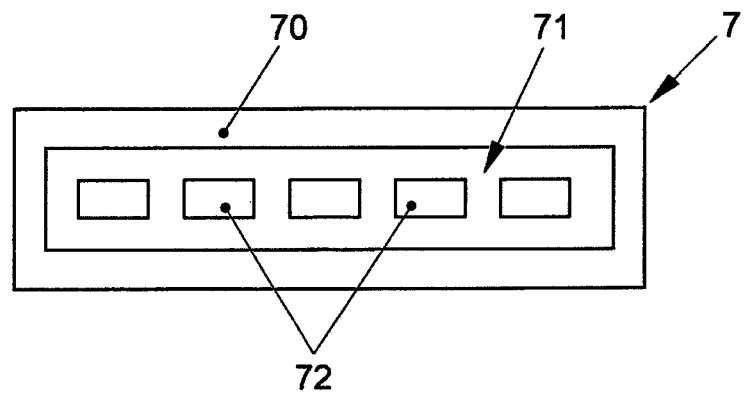
FIG. 5 shows an illustration of a third exemplary embodiment according to the view as in FIG. 4.
Figure 6:
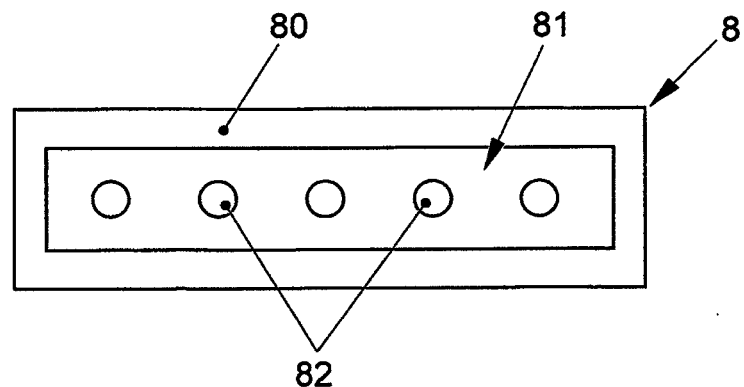
FIG. 6 shows an illustration of a fourth exemplary embodiment, also in a view as in FIG. 4.

Further exemplary embodiments for intermediate elements 6, 7, and 8, which have comparable functions as the described intermediate element 3, can be seen in FIGS. 4 to 6. They differ substantially in the design of their contact surface, with which they can lie on a wall element as described above, for example.

Thus, intermediate element 6 is provided with a contact surface 60 within which a plurality of recesses 61 is formed. Both contact surface 60 and recesses 61 are made rectangular in their outline.

Intermediate element 7 has a contact surface 70 within which a recess 71 is formed. Within recess 71 in turn a number of areas 72 are provided which can form a contact surface in certain areas for a wall element. Contact surface 70, recess 71, and also areas 72 are each formed rectangular in their outline.

Finally, intermediate element 8 shows an embodiment with a contact surface 80, in which in contrast to intermediate element 7 areas 82 introduced within a recess 81 are made circular. Therefore both contact surface 80 and areas 82 form a possible contact for a wall element. A very unfocussed transmission of the generated sound waves is possible with the circular, in the extreme case even almost point-like design of areas 82 within recesses 81; this can be desirable perhaps in distance sensors not employed for parking.

In the shown exemplary embodiments, additionally a sound-absorbing material, for example, foam or the like (not shown), can be inserted in each of recesses 31, 61, 71, and 81, in order to improve the decay behavior of composite assembly 1 comprising electroacoustic transducer 2, intermediate element 3, 6, 7, or 8, and wall element 4.

Figure 7:
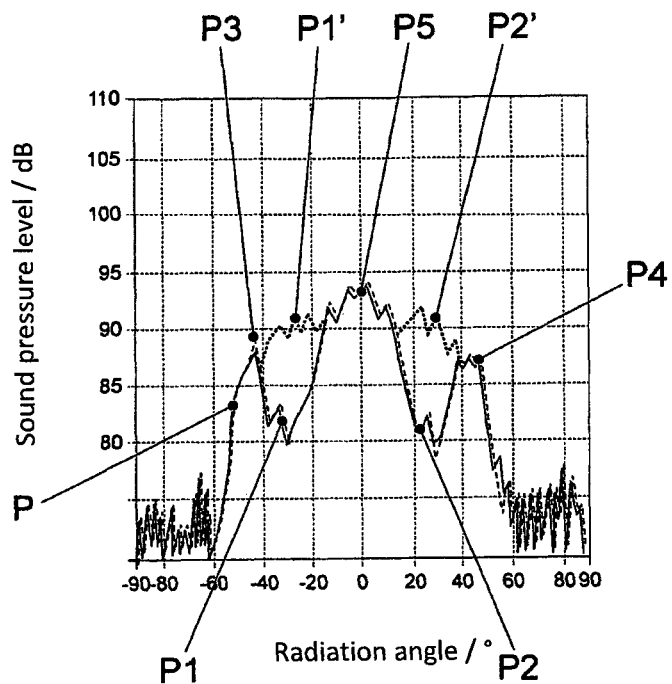
FIG. 7 shows an illustration of sound emission characteristics of a concealed mounted distance sensor without and with the measures of the invention.

Finally, a sound pressure level curve P of a concealed mounted distance sensor will be shown by way of example with FIG. 7.

Thus, the sound pressure level curve P without the inventive design of the composite assembly usually has a maximum P5 of the sound pressure in a radiation angle range of about 0 degrees (direct radiation, perpendicular to the surface of the wall element). Other local maxima P3 and P4 (indirect emission caused by surface waves) are recorded on both sides next to this maximum P5 in an angle range of the radiation angle of about 45 degrees in each case. Between the sound pressure levels P5 and P3 or P5 and P4, drops P1 and P2 in the sound pressure level each form at a radiation angle of approximately 22 degrees.

These drops P1 and P2 can be raised upward (P1' and P2') by the inventive design of the composite assembly, so that overall a smoothed sound pressure level curve arises.

Figure 8:
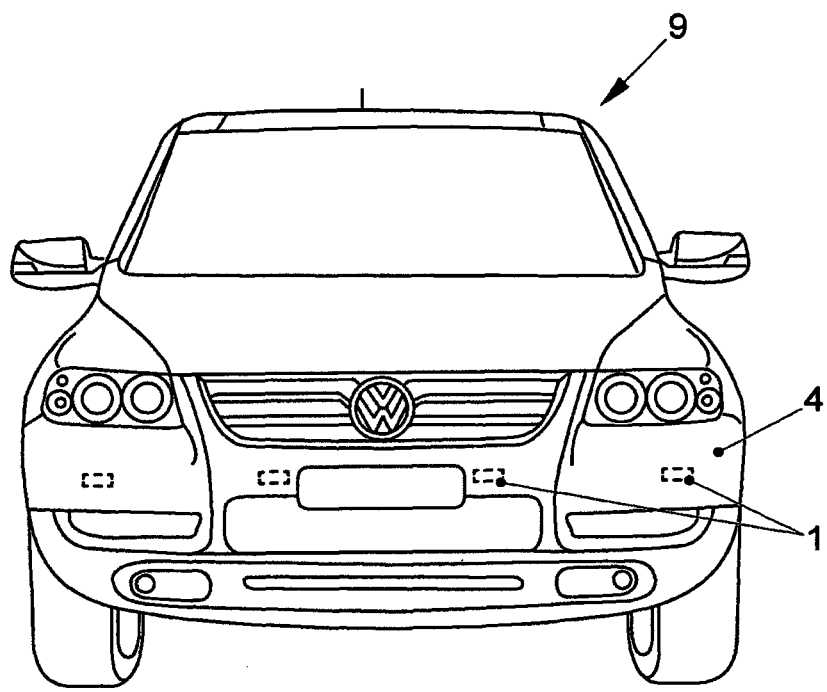
FIG. 8 shows a motor vehicle with composite assemblies of the invention.

Finally, a motor vehicle 9, which in the area of the front bumper cover 4 has a number of composite assemblies 1 of the invention, is shown in FIG. 8. If necessary, these can also be provided at other places of the motor vehicle, for example, in the door, sill, or roof area (not shown).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A composite assembly for a motor vehicle, the composite assembly comprising:
   at least one electroacoustic transducer for emitting sound waves;
   at least one wall element of the motor vehicle, behind which the transducer is mounted in a concealed manner;
   an intermediate element for influencing the sound emission behavior is arranged between the transducer and the wall element, the intermediate element having a contact surface facing the wall element for transmitting the sound waves; and
   a recess in which there is no contact between the intermediate element and the wall element is formed within the contact surface, wherein the recess extends along a bottom of the intermediate element between the intermediate element and the at least one wall element.

2. A composite assembly for a motor vehicle, the composite assembly comprising:
    at least one electroacoustic transducer for emitting sound waves;
    at least one wall element of the motor vehicle, behind which the transducer is mounted in a concealed manner;
    an intermediate element for influencing the sound emission behavior is arranged between the transducer and the wall element, the intermediate element having a contact surface facing the wall element for transmitting the sound waves; and
    a recess in which there is no contact between the intermediate element and the wall element is formed within the contact surface,
    wherein the contact surface has a plurality of recesses.

3. The composite assembly according to claim 1, wherein, within the recess, at least one area is formed in which contact occurs between the intermediate element and the wall element.

4. The composite assembly according to claim 3, wherein the at least one area is circular or rectangular.

5. The composite assembly according to claim 1, wherein the contact surface and the recess are rectangular in their outline.

6. A composite assembly for a motor vehicle, the composite assembly comprising:
    at least one electroacoustic transducer for emitting sound waves;
    at least one wall element of the motor vehicle, behind which the transducer is mounted in a concealed manner;
    an intermediate element for influencing the sound emission behavior is arranged between the transducer and the wall element, the intermediate element having a contact surface facing the wall element for transmitting the sound waves; and
    a recess in which there is no contact between the intermediate element and the wall element is formed within the contact surface,
    wherein the intermediate element is surrounded at least in areas by a damping element, and wherein the damping element is arranged on the wall element and is spaced apart from the intermediate element.

7. The composite assembly according to claim 6, wherein the damping element is arranged frame-like around the intermediate element.

8. The composite assembly according to claim 1, wherein a sound-absorbing material is inserted in the recess.

9. The composite assembly according to claim 1, wherein the recess comprises an open recess.

10. The composite assembly according to claim 1, wherein the recess forms a gap between the intermediate element and the wall element.

11. The composite assembly according to claim 1, further comprising a damping element arranged around the intermediate element.

12. The composite assembly according to claim 11, wherein the damping element comprises contact surface on the wall element.

13. A composite assembly for a motor vehicle, the composite assembly comprising:
    at least one electroacoustic transducer for emitting sound waves;
    at least one wall element of the motor vehicle, behind which the transducer is mounted in a concealed manner;
    an intermediate element for influencing the sound emission behavior is arranged between the transducer and the wall element, the intermediate element having a contact surface facing the wall element for transmitting the sound waves; and
    a recess in which there is no contact between the intermediate element and the wall element is formed within the contact surface,
    wherein the contact surface has a plurality of recesses, and
    wherein the intermediate element is surrounded at least in areas by a damping element.

14. A composite assembly for a motor vehicle, the composite assembly comprising:
    at least one electroacoustic transducer for emitting sound waves;
    at least one wall element of the motor vehicle, behind which the transducer is mounted in a concealed manner;
    an intermediate element for influencing the sound emission behavior is arranged between the transducer and the wall element, the intermediate element having a contact surface facing the wall element for transmitting the sound waves; and
    a plurality of recesses in which there is no contact between the intermediate element and the wall element is formed within the contact surface,
    wherein a sound-absorbing material is inserted in at least one of the recesses.

15. The composite assembly according to claim 8, wherein the sound absorbing material is disposed between a bottom of the intermediate element and the at least one wall element.

16. The composite assembly according to claim 1, wherein the intermediate element contacts the at least one wall element at each end of the intermediate element and the recess extends along the bottom of the intermediate element between the ends of the intermediate element.

17. The composite material according to claim 16, wherein the intermediate element contacts the at least one wall element only at each end of the intermediate element.

* * * * *